(12) United States Patent
Jajtic et al.

(10) Patent No.: US 7,948,123 B2
(45) Date of Patent: May 24, 2011

(54) LINEAR MOTOR WITH FORCE RIPPLE COMPENSATION

(75) Inventors: Zeljko Jajtic, München (DE); Christian Volmert, München (DE)

(73) Assignee: Siemens Aktiengesellschaft, München (DE)

( * ) Notice: Subject to any disclaimer, the term of this patent is extended or adjusted under 35 U.S.C. 154(b) by 127 days.

(21) Appl. No.: 12/375,722

(22) PCT Filed: Jul. 25, 2007

(86) PCT No.: PCT/EP2007/057678
§ 371 (c)(1),
(2), (4) Date: Jan. 30, 2009

(87) PCT Pub. No.: WO2008/015140
PCT Pub. Date: Feb. 7, 2008

(65) Prior Publication Data
US 2009/0322162 A1 Dec. 31, 2009

(30) Foreign Application Priority Data
Jul. 31, 2006 (DE) .......................... 10 2006 035 676

(51) Int. Cl.
*H02K 41/02* (2006.01)
(52) U.S. Cl. .................................................. 310/12.24
(58) Field of Classification Search ............... 310/12.24, 310/12.01, 12.25, 12.26
See application file for complete search history.

(56) References Cited

U.S. PATENT DOCUMENTS

| | | | |
|---|---|---|---|
| 4,286,180 A * | 8/1981 | Langley | 310/12.27 |
| 2004/0256918 A1 | 12/2004 | Beakley | |
| 2005/0046281 A1 | 3/2005 | Sugita et al. | |
| 2009/0256428 A1 * | 10/2009 | Jajtic et al. | 310/12.25 |

FOREIGN PATENT DOCUMENTS
EP 1 365 497 A 11/2003
* cited by examiner

*Primary Examiner* — Dang D Le
(74) *Attorney, Agent, or Firm* — Henry M. Feiereisen; Ursuala B. Day

(57) ABSTRACT

The invention relates to a primary part (2) for an electrical machine (1), with the primary part (2) being formed at least from a laminated core (3) and having at least one element (11) for reduction of the force ripple adjacent to one or both of its respective end faces (S1, S2), with the element (11) being electrically conductive ($\kappa_{el} > 0$) and having negligibly low magnetic permeability ($\mu_r \cong 1$).

17 Claims, 1 Drawing Sheet

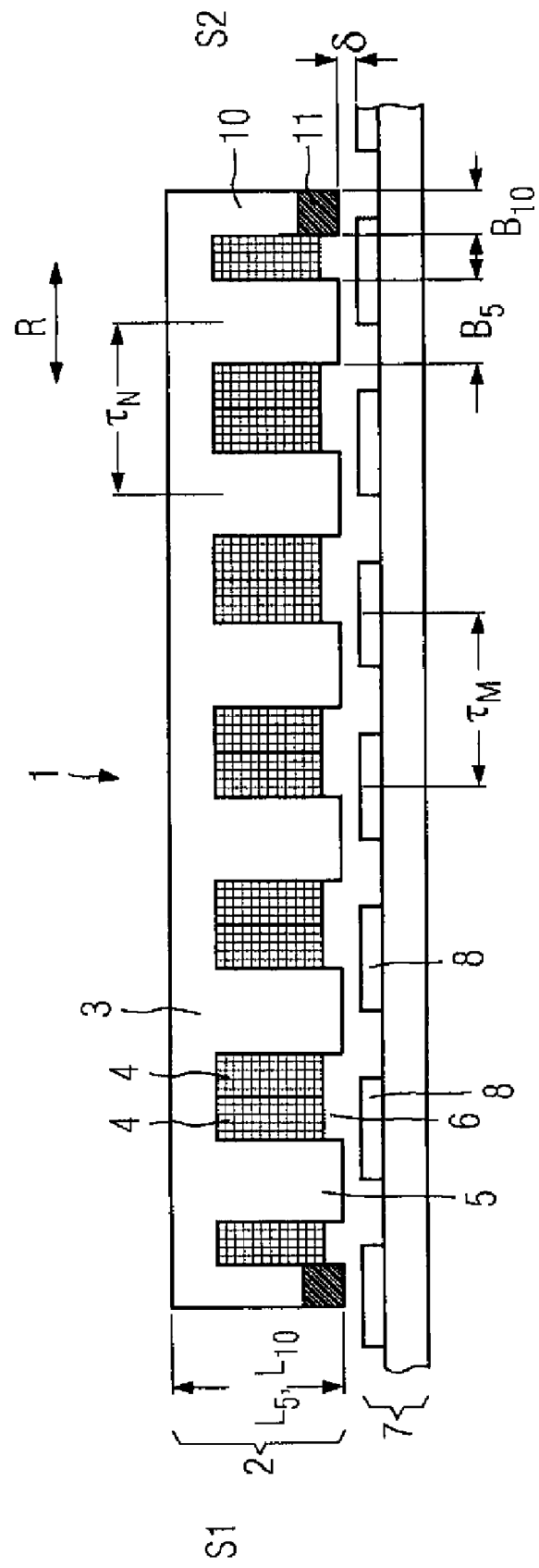

LINEAR MOTOR WITH FORCE RIPPLE COMPENSATION

BACKGROUND OF THE INVENTION

The invention relates to a primary component for an electrical machine, the primary component being formed from at least one laminated core and having an element on one or both of its respective front faces to reduce the force ripple. Furthermore, the invention relates to a linear motor with a primary component of this kind.

Linear motors have a primary component and a secondary component. The secondary component in particular is located opposite the primary component. The primary component is designed for energizing with electric current. The secondary component has permanent magnets or energizable windings for example. Both the primary component and the secondary component have active magnetic means for generating magnetic fields.

For constructional reasons, permanently excited linear motors have force variations which have an adverse effect on even running and dynamics.

In order to guide the magnetic flux from the excitation field of the secondary component and main field of the primary component, toothed laminations are normally used for the active component, i.e. the active wound component, of the motor (primary component). A magnetic interaction takes place between the excitation poles and the toothed structure of the primary component which leads to parasitic cogging forces, also referred to as passive force ripple. This results in vibrations, uneven running and tracking errors in machining processes. Furthermore, the induced voltages, i.e. the electromotive forces (EMF), in the first and last coil on the front faces of the primary component are usually smaller than in the middle coils due to the absence of a magnetic return path. This results in the induced voltages of the motor not forming a symmetrical system and, as well as force losses, an additional current-dependent force ripple, also referred to as active force ripple, is produced.

SUMMARY OF THE INVENTION

The object of the present invention is to develop a linear motor of the kind described in such a way that, as well as reducing the cogging forces, the electromotive forces are also symmetrized.

The object is achieved by a primary component for an electrical machine, the primary component being formed from at least one laminated core and having at least one element on one or both of its front faces to reduce the force ripple, wherein the element is electrically conducting and has a negligibly small magnetic conductivity.

In contrast to rotating machines, by their nature linear motors have end regions in which the electromagnetic part of the motor finishes. If a linear motor is designed with a short stator, for example, there are two end regions for the primary component which lie in the region of influence of the secondary component. The ends of the primary component interact with the secondary component in such a way that this has a definitive influence on the active force ripple and the passive cogging force.

According to the invention, the linear motor has a primary component and a secondary component, the primary component and secondary component being spaced apart from one another by an air gap. The secondary component has a series of poles formed by permanent magnets. The primary component is formed from one or more laminated cores, the laminated core being made up of a plurality of laminations. The primary component has a plurality of slots and teeth, the slots serving to accommodate the primary component windings or coils. The windings are designed, for example, as a three-phase winding of a three-phase network or of a three-phase alternating current.

In particular, linear motors are designed with fractional slot windings and tooth coils in the primary component, wherein the slot pitch of the primary component is not the same as the pole pitch of the secondary component. For example, the ratio of slot pitch to pole pitch (slot pitch/pole pitch)=8/12, 10/12, 11/12, 13/12, 14/12, 16/12.

At least one element, which is designed as an active eddy current damping element, is arranged on one or both front faces of the motor or laminated core in order to reduce the force ripple and is located on or adjacent to the last slot or last wound tooth of the primary component in each case.

The element, which in the following is also referred to as 'damping element', is electrically conducting ($\kappa_{el}>0$) and has a negligibly small magnetic conductivity ($\mu_r \cong 1$).

The electrical conductivity $\kappa_{el}$ is a physical quantity which specifies the ability of a material to conduct electrical current. The electrical conductivity $\kappa_{el}$ is linked to the specific electrical resistance $\rho$, the electrical conductivity being the inverse of the specific resistance ($\kappa_{el}=1/\rho$).

Materials are divided according to the electrical conductivity into
- conductors (in particular all metals, ($\kappa_{el}>0$),
- insulators or non-conductors (most non-metals, $\kappa_{el} \cong 0$),
- semiconductors (e.g. silicon, germanium), where the conductivity lies in the region between conductors and non-conductors, and
- superconductors, whose conductivity below a material-dependent transition temperature is effectively "infinite".

The magnetic permeability $\mu$ determines the permeability of materials to magnetic fields and is expressed as the ratio of the magnetic flux density B to the magnetic field strength H ($\mu$=B/H), where $\mu$ is made up of the magnetic field constant $\mu_0$ and the specific permeability coefficient of the material $\mu_r$ ($\mu=\mu_0\mu_r$). The permeability coefficient $\mu_r$ is frequently referred to as the relative permeability.

Materials are divided according to the relative permeability $\mu_r$ into
- ferromagnetic materials (e.g. iron, cobalt, nickel, $\mu_r \gg 1$), which significantly strengthen the magnetic field;
- paramagnetic materials (e.g. aluminum, air, $\mu_r \cong 1$), which strengthen the magnetic field very slightly; and
- diamagnetic materials (e.g. silver, copper, $\mu_r<1$), which weaken the magnetic field very slightly.

The damping effect of the damping element comes about as a result of eddy currents which are induced in the damping element due to its electrical conductivity when the primary component moves over the magnetic track of the secondary component. The eddy currents act as a "reactive brake" in the primary section. This considerably improves the even-running characteristics of the motor.

The damping effect is dependent on frequency or speed. The higher the speed with which the primary component moves, the more eddy currents are produced in the damping element and the greater the damping effect. Accordingly, the damping effect is good at high speeds and correspondingly less at lower speeds.

The force ripple of the linear motor is improved with the active eddy current damping element. A damping element according to the invention produces a space-optimized and cost-effective solution.

Advantageously, the damping element is arranged on a carrier element for mechanical coupling and thermal bonding.

The function of the carrier element is a mechanical fixing and a thermal bonding of the damping element to the laminated core of the primary component. The whole primary component is usually fixed and cooled by means of the laminated core. It is therefore expedient to implement the mechanical and thermal bonding of the damping element by means of the laminated core, preferably by the carrier element being designed in one piece with the magnetically active laminations of the motor. Due to the fact that the carrier element is part of the laminated core which is magnetically conducting, the carrier element is necessarily also magnetically conducting ($\mu_r \gg 1$).

However, in order to avoid the magnetic motor flux and therefore the force formation being affected by the carrier element, the carrier element should not protrude into the magnetically active region of the secondary component magnets, but should be at a sufficiently large distance from the magnetic surface of the secondary component. This distance should be greater than the distance of the laminated core from the magnetic surface, i.e. greater than the air gap between primary and secondary component. Such a sufficiently large distance is automatically achieved, as the damping element itself is located in this magnetically active region in the vicinity of the magnets in order to achieve the desired damping effect due to induced eddy currents when moving in the strong magnetic field of the secondary component magnets. At the same time, the damping element must have a low magnetic conductivity so that the magnetic flux of the motor is not distorted and therefore the force formation of the motor is not negatively affected.

Preferably, the damping element can be fitted to the supporting structure or carrier element, which is preferably designed as a tooth of the laminations, by force, by bonding or by interlocking. The damping element is attached to the carrier element, which is designed as a carrier tooth of the laminations, by suitable connection means such as gluing, screwing, fastening with a hook or by a dovetail joint for example. The carrier element can also be clamped or clipped to the laminated core.

Preferably, the damping element is arranged so that a heat exchange takes place between carrier element and damping element. A thermal bond or coupling exists between the damping elements and the laminated core of the motor or the individual laminations, as motor laminations and carrier element are in particular designed in one piece. As a result of the eddy currents induced in the damping element, heat is produced which should be appropriately dissipated, as otherwise too much heat will be developed, which under certain circumstances can cause damage to the components.

Advantageously, the laminated core is designed together with the carrying element in one piece. The carrying element is formed when the laminations are manufactured, i.e. the laminations are cut in one piece, as a result of which the individual laminations with carrying elements can be manufactured easily and cost-effectively.

Laminated core and carrier element can also be designed in two parts, wherein the carrier element can be attached to the laminated core by force, by bonding or by interlocking.

Advantageously, the damping element is made from solid aluminum (Al) or copper (Cu). These materials have high electrical conductivity, are inexpensive and can be easily machined.

The active damping element is designed as a solid element so that the damping effect due to the eddy currents induced in the damping element when the primary component moves over the magnets of the secondary component can be achieved. At the same time, the damping element must have a low magnetic conductivity so that the magnetic flux of the motor is not distorted and therefore the force formation of the motor is not negatively affected.

In a further embodiment, the carrier element is designed so that it rests at least partially or completely against an adjacent coil in order to exchange heat. This results in a better cooling of the coil.

Preferably, the surface of the damping element facing the air gap is rounded. For example, the damping element has rounded corners with a specifiable radius. This measure contributes to reducing the cogging forces.

It is possible for not every lamination to be provided with a carrier element. For example, only every second lamination has a carrier element. With single-piece primary components, i.e. primary components with only one laminated core, it is possible that every lamination only has a carrier element at an end region of the lamination. The individual laminations can then be joined to form the laminated core so that, for example, by rotating the individual laminations, the carrier element is aligned to the left or to the right. This achieves adequate stiffness of the carrier element.

The damping element can also be arranged in such a way that the first and last laminations of the laminated core each have carrier elements, the length of which corresponds to the length of a main tooth of the laminated core. The long outer laminations each have an opening or hole, by means of which the damping element can be arranged between the outer laminations using a pin for example. The two outer laminations with long carrier elements constitute only a relatively low disturbance of the original motor flux or motor force formation.

For a design of the linear motor which optimizes the installation space, a minimum width and as small a distance as possible of the carrying tooth (carrier element) from the electrically-magnetically active parts of the primary component (winding and laminated core) are aimed for.

Furthermore, the damping element is at a distance from the adjacent wound tooth or teeth of the laminated core.

Advantageously, the distance between the damping element and the neighboring tooth or teeth is chosen so that it corresponds to the pole pitch of the secondary component, so that as high a flux linkage as possible with the last coil and therefore a desired increase in the induced voltage of the last coil occurs.

For a design of the linear motor which optimizes the installation space, a minimum width and as small a distance as possible of the damping element are aimed for. This gives an optimum distance of the damping element from the adjacent wound tooth, which is less than the pole pitch of the secondary component. However, the distance of the damping element can also be greater than the pole pitch of the secondary component.

The primary component of the linear motor can consist of a plurality of laminated cores arranged one behind the other in the direction of motion. Accordingly, the centrally arranged laminated cores do not have damping elements but, according to the invention, damping elements are arranged only on the respective ends, i.e. the front faces, of the primary component. Here, for example, by rotating a lamination with a right-hand-side element it becomes a lamination with a left-hand-side element, so that gapless elements are provided on the front faces of these primary components. In the case of primary components with only one laminated core, i.e. one-piece primary components, damping elements must be provided at each end.

In a further embodiment of the invention, the active damping element and/or the corresponding carrier element are not formed over the full width of a laminated core. The width of the laminated core extends perpendicular to the direction of motion of the primary component. The damping element therefore only extends over a partial region of the laminated core, for example, wherein the damping element can then be arranged centrally on the laminated core. By forming only partial damping elements, the matching between passive and active force ripple can be carried out according to the particular demands on the linear motor.

The primary component according to the invention is preferably provided for a linear motor. The primary component can however also be used in rotating machines, wherein the stator has end regions, such as segmented rotating motors for example.

BRIEF DESCRIPTION OF THE DRAWING

Further characteristics and details of the invention are explained in more detail in the following description in conjunction with the attached drawings with reference to exemplary embodiments. At the same time, characteristics and correlations described in individual variants can basically be transferred to all exemplary embodiments. In the drawings:

FIG. 1 shows a side view of a linear motor according to the invention.

DETAILED DESCRIPTION OF PREFERRED EMBODIMENTS

FIG. 1 shows a side view of a synchronous linear motor 1 shown in principle, which has one or more laminated cores 3, the respective laminations of which are stacked parallel to the plane of the drawing and which form the primary component 2. The direction of motion of the linear motor 1 is shown by the arrow R. The primary component 2 also has the coils 4. The coils 4 encompass the teeth 5 of the primary component 2 in such a way that different coils 4 are located in one slot 6. Furthermore, the linear motor 1 has the secondary component 7 with the permanent magnets 8. The secondary component 7 is positioned on a machine bed which is not shown in more detail. The permanent magnets 8 are arranged with the pole pitch $\tau_M$. The pole pitch $\tau_M$ can however also be formed by electrical excitation of an excitation winding arranged in the secondary component 7. Primary component 2 and secondary component 7 are spaced apart from one another by the air gap $\delta$.

The slot pitch $\tau_N$ of the primary component 2 is preferably not the same as the pole pitch $\tau_M$ of the secondary component.

An element 11 for reducing the force ripple is arranged on each of the front faces S1 and S2 of the laminated core 3. The element 11, also referred to as a damping element, is electrically conducting and has as low a magnetic conductivity as possible. The damping element 11 is made from solid material so that the eddy currents can form in the damping element 11. The damping element 11 is fixed to a carrier element 10, which is preferably designed as a tooth of the laminated core 3.

Furthermore, the damping element 11 with the carrier tooth 10 has the length $L_{10}$ which corresponds to the length $L_5$ of a main tooth 5.

For a design of the linear motor 1 which optimizes the installation space, a minimum width $B_{10}$ and as small a distance as possible, i.e. less than the pole pitch $\tau_M$, of the carrier element 10 with the damping element 11 from the last coil 4 of the primary component 2, are aimed for. This produces a good thermal contact between the last coil 4 and the carrier element 10, as a result of which the last coil 4 is well cooled.

What is claimed is:

1. A primary component for a linear electrical machine, comprising:
   a laminated core having a plurality of main teeth having a length and a carrier tooth disposed on at least one of two front faces of the laminated core in a direction of motion of the linear electrical machine; and
   an element arranged on an end face of the carrier tooth to reduce a force ripple, said element sized to have a combined length with the carrier tooth which is equal to the length of the main teeth, said element being electrically conducting and having a negligibly small magnetic conductivity.

2. The primary component of claim 1, wherein the element is mechanically coupled and thermally bonded to the carrier tooth.

3. The primary component of claim 2, wherein the carrier tooth is arranged on the laminated core and formed in one piece with the laminated core.

4. The primary component of claim 2, wherein the element is attached to the carrier tooth by force, by bonding or by interlocking.

5. The primary component of claim 2, further comprising a winding system with plural coils, wherein the carrier tooth rests at least partially against an adjacent one of the coils.

6. The primary component of claim 1, wherein the element is made of solid aluminum or copper.

7. The primary component of claim 1, wherein the element has a width perpendicular to a height of the element and the direction of motion of the linear electrical machine, wherein the width extends a partial region of the laminated core.

8. The primary component of claim 7, wherein the element is arranged width-wise centrally on the laminated core.

9. A linear motor, comprising:
   a primary component including a laminated core having a plurality of main teeth having a length and a carrier tooth disposed on at least one of two front faces of the laminated core in a direction of motion of the linear electrical machine; and an element arranged on an end face of the carrier tooth to reduce a force ripple, said element sized to have a combined length with the carrier tooth which is equal to the length of the main teeth, said element being electrically conducting and having a negligibly small magnetic conductivity; and
   a secondary component spaced apart from the primary component by an air gap.

10. The linear motor of claim 9, wherein the element is mechanically coupled and thermally bonded to the carrier tooth.

11. The linear motor of claim 10, wherein the carrier tooth is arranged on the laminated core and formed in one piece with the laminated core.

12. The linear motor of claim 10, wherein the element is attached to the carrier tooth by force, by bonding or by interlocking.

13. The linear motor of claim 10, wherein the primary component has a winding system with plural coils, wherein the carrier tooth rests at least partially against an adjacent one of the coils.

14. The linear motor of claim 9, wherein the element is made of solid aluminum or copper.

15. The linear motor of claim 9, wherein at least one of a surface and corner of the element in confronting relationship to the air gap is rounded with a predefined radius.

16. The primary component of claim 9, wherein the element has a width perpendicular to a height of the element and the direction of motion of the linear electrical machine, wherein the width extends a partial region of the laminated core.

17. The primary component of claim 16, wherein the element is arranged width-wise centrally on the laminated core.

* * * * *